United States Patent
Kasbekar

(10) Patent No.: US 10,931,715 B2
(45) Date of Patent: *Feb. 23, 2021

(54) HTTPS REQUEST ENRICHMENT

(71) Applicant: Akamai Technologies, Inc., Cambridge, MA (US)

(72) Inventor: Mangesh Kasbekar, New York, NY (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,746

(22) Filed: Sep. 23, 2019

(65) Prior Publication Data

US 2020/0021614 A1  Jan. 16, 2020

Related U.S. Application Data

(63) Continuation of application No. 14/868,771, filed on Sep. 29, 2015, now Pat. No. 10,425,446.

(60) Provisional application No. 62/072,718, filed on Oct. 30, 2014, provisional application No. 62/056,772, filed on Sep. 29, 2014.

(51) Int. Cl.
*H04L 29/06* (2006.01)
*H04L 29/08* (2006.01)

(52) U.S. Cl.
CPC ........ *H04L 63/166* (2013.01); *H04L 63/0281* (2013.01); *H04L 69/321* (2013.01); *H04L 63/0428* (2013.01)

(58) Field of Classification Search
CPC . H04L 63/166; H04L 69/321; H04L 63/0281; H04L 63/0428
See application file for complete search history.

(56) References Cited

U.S. PATENT DOCUMENTS

| | | | | |
|---|---|---|---|---|
| 6,978,367 | B1 * | 12/2005 | Hind | G06F 21/577 380/273 |
| 8,850,223 | B1 * | 9/2014 | Helsel | G06F 21/72 713/189 |
| 2002/0035681 | A1 * | 3/2002 | Maturana | H04L 69/166 713/151 |
| 2002/0112152 | A1 * | 8/2002 | VanHeyningen | H04L 9/0838 713/151 |
| 2003/0014624 | A1 * | 1/2003 | Maturana | H04L 29/06 713/151 |
| 2003/0023845 | A1 * | 1/2003 | VanHeyningen | H04L 9/0643 713/151 |

(Continued)

OTHER PUBLICATIONS

Counterpart EP Application 15847121.9 Allowance dated Sep. 2, 2020, 40 pages.

(Continued)

*Primary Examiner* — Cheng-Feng Huang
(74) *Attorney, Agent, or Firm* — David H. Judson

(57) ABSTRACT

This disclosure provides for a network element (in the middle) to inject enrichments into SSL connections, and for taking them out. This network element is sometimes referred to herein as a "middle box." In the context of layered software architecture, this solution preferably is implemented by a library that operates below the SSL layer and above the TCP sockets layer at the two endpoints of the SSL connection. Preferably, the SSL enrichments are implemented as SSL/TLS records.

20 Claims, 7 Drawing Sheets

(56) References Cited

U.S. PATENT DOCUMENTS

| | | | | |
|---|---|---|---|---|
| 2003/0177348 A1* | 9/2003 | Davies | H04L 67/02 | 713/153 |
| 2004/0268152 A1* | 12/2004 | Xia | H04L 63/0281 | 726/5 |
| 2006/0136724 A1* | 6/2006 | Takeshima | H04L 63/166 | 713/168 |
| 2006/0224883 A1* | 10/2006 | Khosravi | H04L 63/166 | 713/151 |
| 2008/0049942 A1* | 2/2008 | Sprunk | H04L 9/006 | 380/283 |
| 2008/0263215 A1* | 10/2008 | Schnellbaecher | H04L 63/0281 | 709/229 |
| 2009/0193129 A1* | 7/2009 | Agarwal | H04L 67/28 | 709/229 |
| 2009/0271613 A1* | 10/2009 | Brabson | H04L 67/1014 | 713/151 |
| 2010/0228963 A1* | 9/2010 | Kassab | G06Q 30/02 | 713/150 |
| 2011/0191442 A1* | 8/2011 | Ovsiannikov | H04L 63/0272 | 709/218 |
| 2011/0264905 A1* | 10/2011 | Ovsiannikov | H04L 63/168 | 713/151 |
| 2013/0191631 A1* | 7/2013 | Ylonen | H04L 63/16 | 713/153 |
| 2013/0305392 A1* | 11/2013 | Bar-El | G06F 21/83 | 726/29 |
| 2013/0312054 A1* | 11/2013 | Wang | H04L 63/166 | 726/1 |
| 2014/0173700 A1 | 6/2014 | Awan et al. | | |
| 2014/0337614 A1* | 11/2014 | Kelson | H04L 63/168 | 713/152 |
| 2014/0344908 A1* | 11/2014 | Rizzo | H04L 63/126 | 726/6 |
| 2015/0288679 A1* | 10/2015 | Ben-Nun | H04L 67/141 | 726/10 |

OTHER PUBLICATIONS

Counterpart EP Application 15847121.9, Exam Report dated Jul. 3, 2019, 6 pages.

Counterpart CN Application No. 2015800570239, First Office Action dated Jun. 5, 2019, 16 pages (includes English translation).

* cited by examiner

600 int getsslenrichmentcount(int fd) ;
int readsslenrichmentsize(int fd) ;
int readsslenrichment(int fd, void *buf, size_t count) ;
int writesslenrichment(int fd, void *buf, size_t count) ;

HTTPS REQUEST ENRICHMENT

BACKGROUND

Technical Field

This application relates generally to secure network-based communications using cryptographic protocols.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

HTTP request enrichment is a useful and low-overhead technique used by Internet Service Providers (ISPs) to pass on client intelligence to HTTP servers. This is usually achieved with the help of a Deep Packet Inspection (DPI) box capable of identifying HTTP requests, interjecting text into them, and offsetting the TCP flow's sequence numbers correctly between client and server. This functionality, however, cannot exist for HTTPS requests because a middle box is incapable of inserting anything into an SSL flow.

As additional background, many mobile network operators use transparent proxies and online transcoding or transrating devices to shape traffic in high traffic hours, e.g., based on real-time conditions in their network. These methods are very useful to the operators, but they are becoming increasingly irrelevant due to the growing volume of SSL streaming.

BRIEF SUMMARY

A method for HTTPS request enrichment is described. In one embodiment, the method uses a special form of enrichment record, and it takes advantage of a software layer between TCP and SSL/TLS that handles the enrichment records and an application programming interface (API) of this layer that the SSL/TLS layer and the application layer can use. The techniques herein also provide for discovery of enrichment capability and key negotiation for the secure communication of enrichments.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
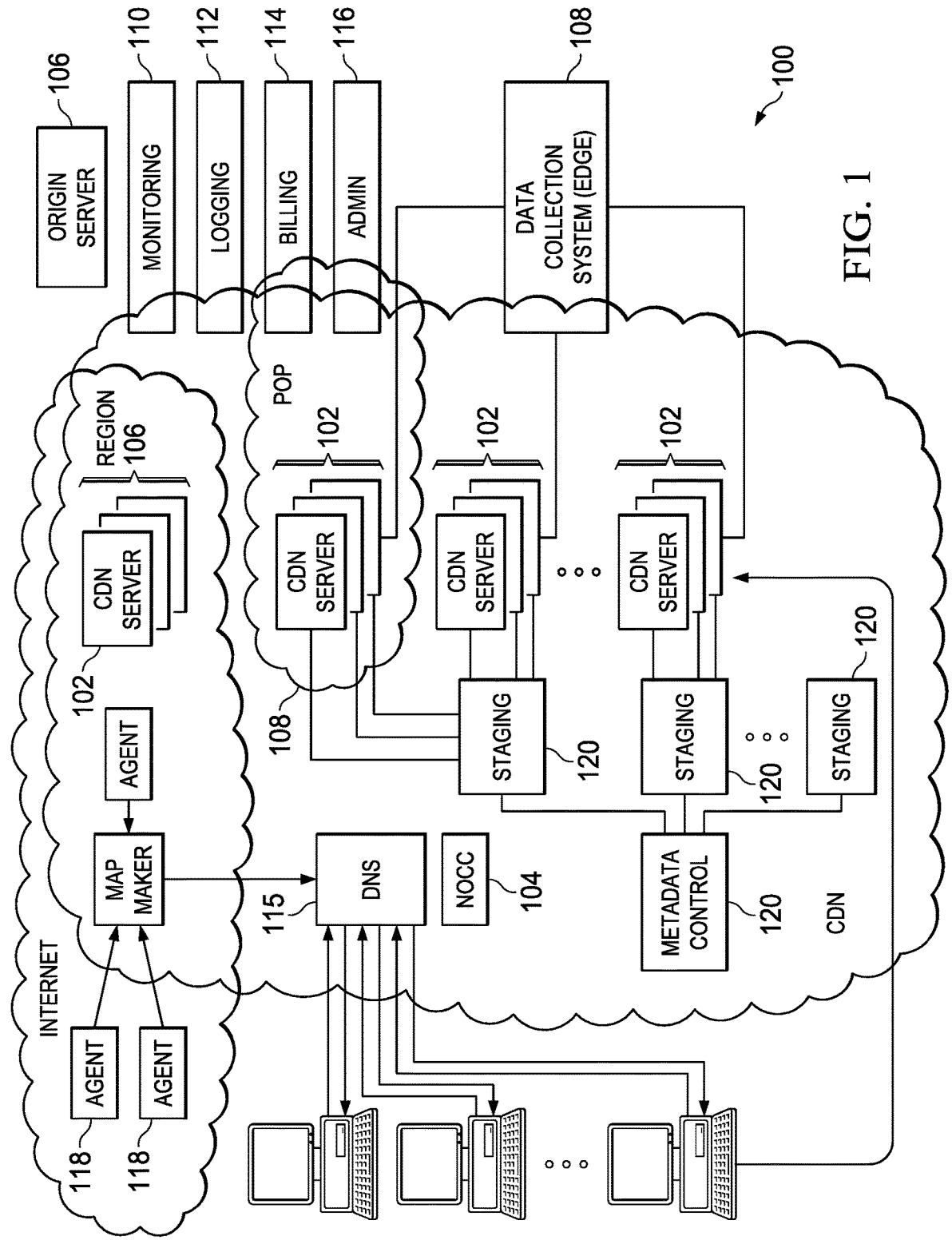
FIG. 1 depicts an overlay network, such as a content delivery network (CDN), in which the techniques of this disclosure may be practiced.

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
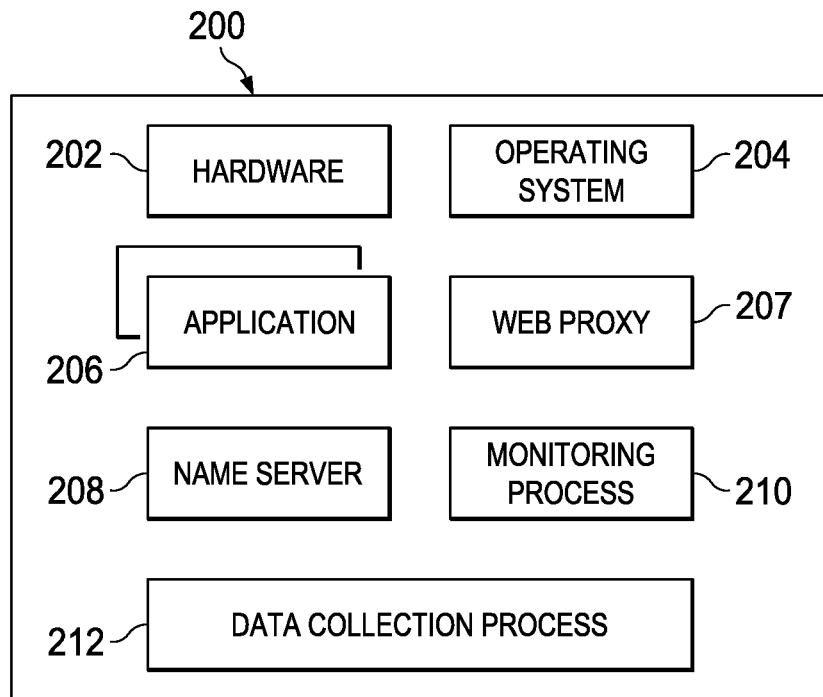
FIG. 2 depicts an architecture of an edge server of the overlay network.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of additional background, it is known in the prior art to provide so-called HTTP request enrichment. The following provides details of this technique. First, consider the flow of an HTTP (non-SSL) request/response through a network connecting a client and a server. Theoretically, such a flow may be intercepted by network elements in the middle, such as transparent proxies, gateways, layer-7 switches, and the like. The network elements may choose to autonomously insert extra headers into the HTTP request to communicate addition auxiliary information about the request to the server. This is the process of HTTP request enrichment. In addition, the server may add additional auxiliary information about the response into some headers, which the network element in the middle may then read and extract from the response headers before sending it to the client. This HTTP request enrichment is available as a simple feature in many commercially-available network elements. For example, Juniper Networks mobile networks gateway includes a feature to enrich every HTTP request coming from a mobile device with the MSISDN number of the device, so that the server can identify the user.

HTTP is a text-based protocol, and it does not attempt to preserve the authenticity of request/response headers through mechanisms such as check-summing or the like. HTTP header enrichment works in this (non-HTTPS-based) environment because the network elements are able to see the request and response structure in the data flow on the wire, and further because insertion/extraction of information does not break any security mechanisms.

HTTPS Request Enrichment

HTTPS is a protocol that uses encryption for communication. SSL/TLS are the basic techniques. The encryption techniques make it impossible for a man-in-the-middle observer to know the encryption keys. In this environment, the network elements in the middle can neither decipher the encrypted communication, nor can they insert any data into the encrypted flow. The network elements in the middle therefore cannot enrich HTTPS requests in a manner similar to HTTP.

One alternative to communicating enrichment information, e.g., between the server and a network element in the middle of a client-server flow, is to use an "out-of-band" method. In this approach, the network element may send enrichment information about an ongoing HTTPS connection to the webserver on a separate connection. As a concrete example, if a mobile device at IP address ip1 connects to a server at IP address ip2, then enrichment of the above example could be implemented through a separate HTTPS request from the network element to the server, which sends the server at ip2 a pair <ip1, some data>. The server may then be required to apply the enrichment information to the right client requests, e.g., by checking the client's ip/port against all enrichments received. While this approach works in certain network environments, this type of solution fails to function in the presence of Network Address Translation (NAT) devices between the network entity and the server. In this scenario, the client's IP address may be seen as ip1 (the pre-NAT address) by the network entity and as ip3 by the server (the post-NAT address). To successfully enrich requests in the presence of NAT, either the network entity or the server must have a way to do translation between the two ip addresses of the same client in real time. The NAT problem is almost always encountered when a network element is inside a mobile element and the server is on the public internet. In particular, the NAT mechanism used by mobile gateways often has no real-time API for (in this example ip1↔ip3) translations, which makes enrichment of HTTPS requests difficult.

The subject matter of this disclosure addresses this problem, as is now described.

The technique provides for an SSL enrichment mechanism for HTTPS requests.

This approach enables a network element (in the middle) to inject enrichments into SSL connections, and for taking them out. This network element is sometimes referred to herein as a "middle box." In the context of layered software architecture, this solution preferably is implemented by a library that operates below the SSL layer and above the TCP sockets layer at the two endpoints of the SSL connection. This implementation, however, is not intended to be limiting.

As will be seen, this approach has several attractive properties. In particular, because enrichments are injected into the data flow of an SSL connection, the method is immune to the NAT problem. Injecting enrichments into the data flow in this manner also is more efficient than the out-of-band enrichments method. Because in the preferred embodiment the library preferably is below the SSL layer, the implementation does not require any changes to the SSL layer (e.g., an OpenSSL package). Rather, in effect the library is a man-in-the-middle (MITM) entity as far as the SSL protocol goes. In this position in the protocol stack, the enrichment layer has the same vantage point as that of other entities in the middle, such as WiFi devices, firewalls, switches, routers, DPI boxes and the like. The enrichment layer, like any of these entities, neither is able to get access to the session keys of the SSL connection, nor influence the mechanism used to negotiate them. Its ignorance of the session key prevents the layer from deciphering the contents of encrypted communications and/or writing correctly-encrypted data into the connection on behalf of the either endpoint. In addition, the layer does not need the SSL certificate for its operation at the connection's endpoints, or in the network elements in the middle. By virtue of the above properties, this method is easily proved to introduce no security risks.

The enrichment method is now further explained below in detail.

Figure 3:
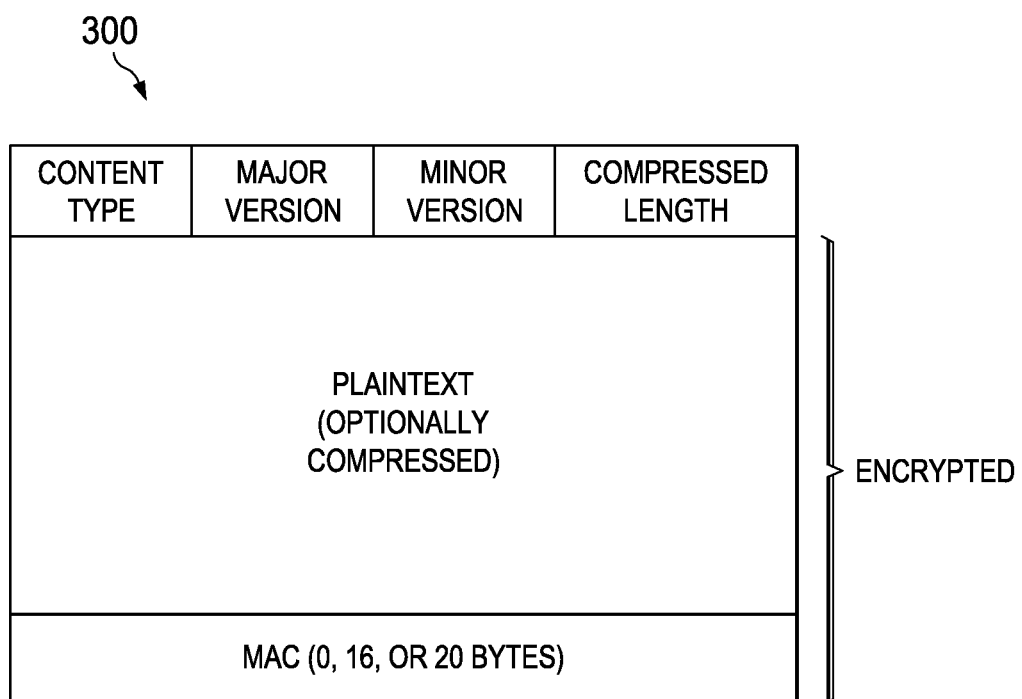
FIG. 3 depicts a standard record format for an SSL/TLS record.
Figure 4:
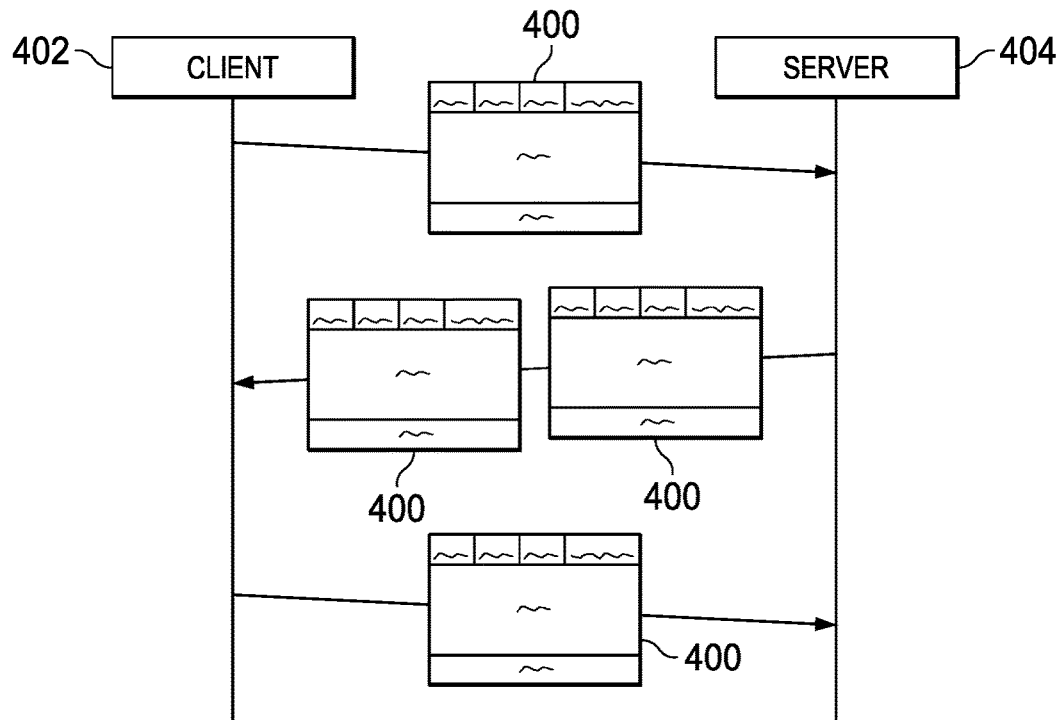
FIG. 4 depicts a conventional exchange of SSL records between a client and a server.

By way of background, to establish an SSL connection with the server, the client first establishes a TCP connection to the server; it then proceeds with the SSL handshake, in which messages of various types such as client-hello, server-hello, certificate, etc. are sent and received. At the end of the handshake, the session (master) key is established and the encrypted payload starts to flow through the SSL connection in both directions. The messages, as well as the encrypted payload, are organized in the form of SSL/TLS records. The record format is standardized, and it is shown by record 300 in FIG. 3. This record format comprises a Content Type (or Type) field, a Major Version field, a Minor Version field, a Compressed Length field, the Plaintext, and a Message Address Code (MAC) field. The Plaintext and the MAC fields may be encrypted. As is known, the exchange of records 400 between a client 402 and a server 404 typically proceeds as illustrated in FIG. 4.

There is no strict requirement on the content and the format of enrichment data for the scheme of this disclosure to work. At a very basic level, the scheme only requires that the injected data does not change the original content of the SSL records, and that the two endpoints must be able to distinguish between the original records and injected enrichment data. To simply the design, preferably the enrichment data is inserted into the connection (in either direction) between two SSL/TLS records as opposed to being inserted directly into the body of any original record. Also, preferably enrichment data is represented as an SSL/TLS record. Accordingly, the enrichment data is sometimes termed an enrichment record.

For the identification of enrichment data, preferably the values chosen for <type, major version, minor version> of the enrichment record are not necessarily legal values for the connection, e.g., the first byte of each record specifies the record type. For SSLv3, only the values in the range of 20-24 are valid values for record type. According to the approach herein, any unused number can be claimed (and thus used) for the type of the enrichment record. In one example embodiment (non-limiting), −1 is used as the type of enrichment record. Because the enrichment record is an illegal record for the standard SSL/TLS protocol, any SSL connection would be terminated if the SSL library sees this record on the connection. That said, because the enrichment library preferably operates below the SSL layer, it is the library's responsibility not to pass along an enrichment record to the SSL layer above it.

Figure 5:
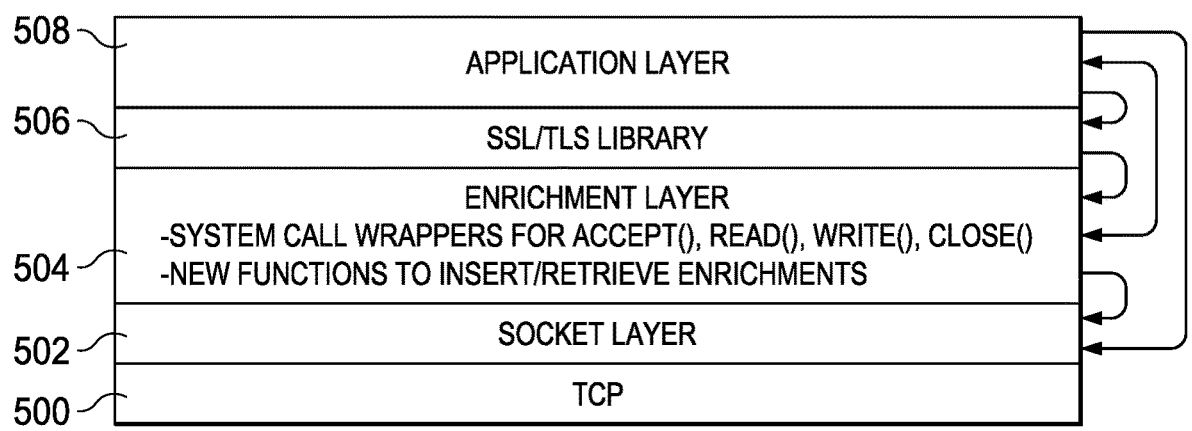
FIG. 5 depicts a representative implementation for the request enrichment technique of this disclosure.
Figures 6, 7:
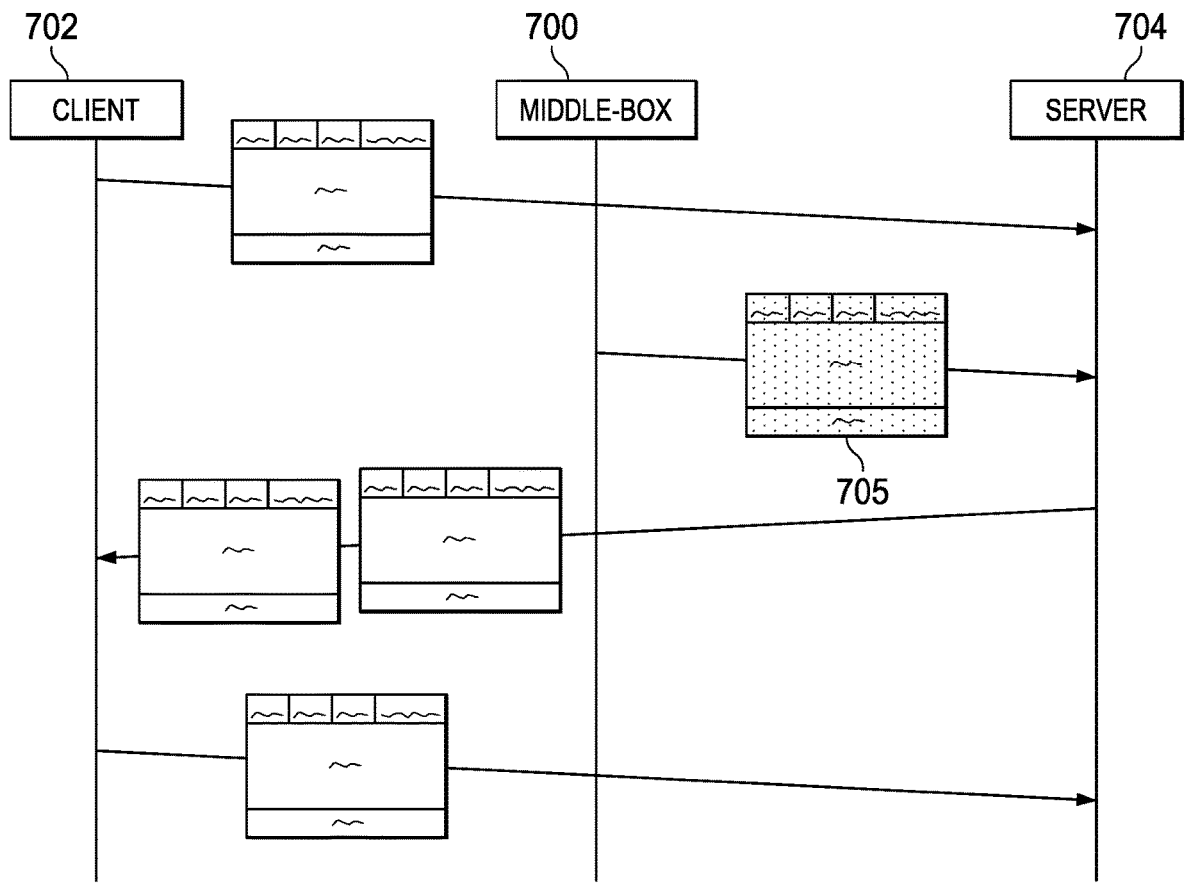
FIG. 6 shows various functions that may be implemented by the enrichment layer in FIG. 5.
FIG. 7 depicts how an SSL request enrichment is incorporated into the message flow in one embodiment.

In a representative embodiment, as depicted in FIG. 5, the software layers on the server side typically comprise (from bottom up) TCP 500, a TCP socket layer 502, the enrichment layer 504 of this disclosure, an SSL layer 506 (e.g., OpenSSL), and the application layer 508. FIG. 6 shows various functions 600 that the enrichment layer 504 provides to the application layer 508 to send/retrieve enrichments. The functions shown in FIG. 6 are representative, and various operations may be combined. As far as the application layer is concerned, it simply calls one or more of the functions shown in FIG. 6 to get enrichments from the SSL connection, to send them on that connection, or the like.

The following provides additional details of a representative enrichment layer 504 according to this approach.

As is well-known, the SSL layer 506 uses TCP sockets layer 502 for network communication. In particular, the SSL layer 506 uses standard system calls, such as open ( ) close ( ) read ( ) write ( ) listen ( ) and accept ( ) with sockets. According to this disclosure, the enrichment layer 504 intercepts the calls between the SSL library 506 and the sockets layer 502, preferably by using a system call wrapping mechanism. In particular, the system calls preferably are wrapped by the enrichment layer 504 so that, when the SSL layer 506 makes one of these system calls, the corresponding (wrapper) function of the enrichment layer gets called. The wrapper function can then invoke the original system call, in addition to performing additional actions.

Thus, for example, when the SSL layer calls read ( ) to receive data from the network, the enrichment layer's read wrapper gets called. This function, in turn, invokes the original system call read ( ) function to receive data from the network. The data is then examined for SSL record structures, and any enrichment records found in it are taken out; the enrichment data from these records preferably is stored in a memory table for incoming enrichments, corresponding to the socket from which they were read. The remaining data is then passed on to the SSL layer as part of the read ( ) call.

When the application calls other API functions of FIG. 6, such as a get SSL enrichment count (getsslenrichmentcount ( )), a read SSL enrichment size (readsslenrichmentsize ( )), a read SSL enrichment (readsslenrichment ( )), etc., the enrichment layer answers the calls using the table that stores these enrichments for each socket.

When the application layer calls a write SSL enrichment function (writesslenrichment( )), preferably the result is stored into another table that stores outgoing enrichments per socket. When the SSL layer makes a write ( ) call on the socket, the enrichment layer's write wrapper gets called. This function, in turn, invokes the original system call write ( ) to send data to the network. After the boundary of any SSL record written into the socket, an enrichment frame is constructed out of the outgoing enrichment data in the table for the given socket and written into the socket.

Preferably, the wrappers for system calls accept ( ) and close ( ) perform housekeeping tasks.

Figure 8:
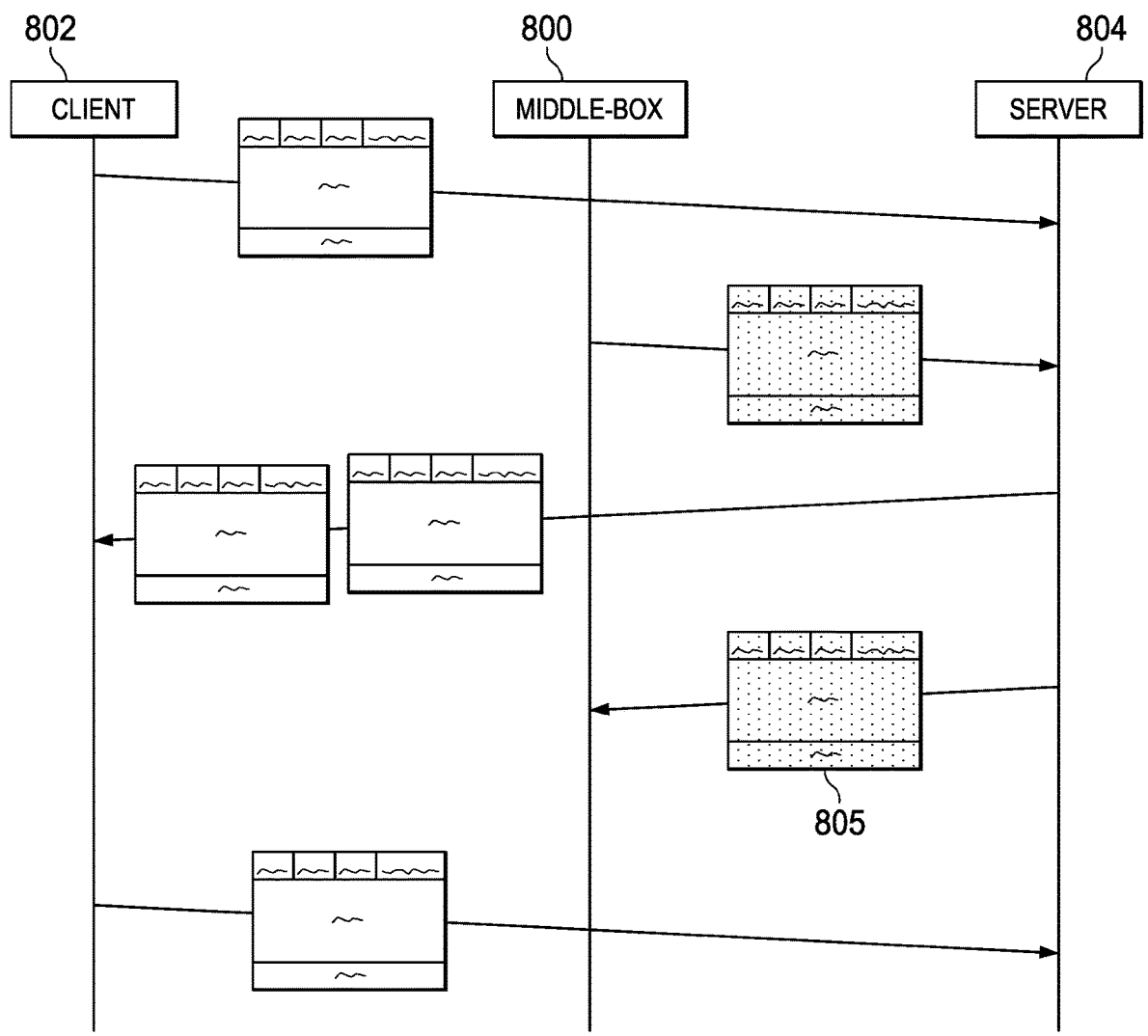
FIG. 8 depicts how an SSL request enrichment is incorporated into the message flow in another embodiment.

The following describes the role of the network element located in the middle (preferably a mobile networking element) and, in particular, how SSL enrichments can be used in to enrich an SSL request. In this example, the enrichment is a real-time bandwidth guidance for the end user's device. This is just a representative example and is not intended to limit the type of enrichment that may be implemented using this scheme. In this example scenario, and with reference to FIG. 7, the network element 700 in the middle functions as a transparent TCP proxy between client 702 and server 704. The mobile network's administrator can configure network routing to send all the user's packets destined to the server's listening port (443) to the TCP proxy. Typically, the proxy 700 terminates the TCP connection, although this is not a requirement. Logically, and as noted above, the proxy is not an SSL endpoint; rather, it is a man-in-the-middle for the SSL connection. It identifies the server IP address and makes a separate connection to the server IP address on the SSL port. As such, the proxy 700 acts as a forwarder of data in both directions between the pair of connections. This proxy also links the enrichment library for the request enrichment operation. To this end, at any point in time during the life of the connection pair, the proxy can call the writesslenrichment ( ) API function to insert its knowledge of the client's bandwidth guidance into the SSL connection to the server 704. This is illustrated in FIG. 7, which shows the flow of SSL records for the above scenario. In this example, the enrichment record 705 is immediately after the first SSL record from the client 702, i.e., the client-hello record. Enrichments 805 could also be sent in the reverse direction, i.e. from the server 804 to the network element 800 in the middle and then on to the client 802, should there be a need for such communication. FIG. 8 illustrates this option.

Of course, there may be multiple network elements in the path of the SSL connection that could each insert, extract or read-and-forward the enrichments.

Because the record type of an enrichment record is not necessarily a legal SSL/TLS record type, enrichment records should not be sent by any sender unless it is convinced that the receiver and all the network elements in the middle are able to process them without error. Discovering whether the path and destination is "enrichment-capable" preferably requires a separate method. A simple way to implement this functionality is through device configuration. The network element could simply take a list of servers that accept enrichments as its configuration. In single-administrator environments, this type of method is effective. When multiple administrative domains are involved in communication, however, then a more automatic discovery mechanism is warranted. The following discovery protocol may be used in such a scenario.

In particular, preferably the network element observes the traffic passing through it to all the server IP addresses to which clients are forming connections. The network element then initiates a discovery connection to each of them. As part of the discovery connection, the network element initiates an SSL handshake and inserts an enrichment record into it before the handshake is complete. This enrichment record identifies the sender, and it requests that the receiving entity (or entities) identify themselves. When the destination server or a network element in the middle does not have the enrichment layer, their SSL layer sees the enrichment record, which causes it to terminate the connection with an error. The network element thus knows that either the server or the path to it is not ready for enrichments. When every network element on the path and the destination server are able to process the enrichment record, then they respond by adding an enrichment record identifying themselves into the SSL connection towards the sender. If the SSL handshake with a server completes successfully, then the network element can conclude that the path to the server and the server itself are enrichment-capable. The network element also can retrieve the identification of each entity on the path from the enrichment(s) received from connection. When the discovery process completes as needed, the network element can inject enrichments into clients' SSL connections to this server as has been described.

The above method is able to discover the presence of enrichment-capable network elements in the path to the destination, even if the destination server itself is not enrichment capable.

There is no strict encryption requirement on enrichment data. In systems where the public Internet is used, however, security of enrichment data should be implemented. For a server on the public Internet, enrichment data received typically cannot be trustworthy unless its source is trusted and the server is guaranteed not to have been tampered by any network entity on the path after the data was sent. Preferably, enrichment data in such cases should be encrypted with a key known only to the two endpoints.

Device configuration is a simple method to provision common keys for any network element and the server to which the device wants to send enrichment information. Alternatively, for systems spanning multiple administrative domains, the following design for key negotiation at runtime may be used. The server is assumed to provide a publicly-accessible secure URL that network elements can use to negotiate keys. The discovery connection may be extended for this purpose. In addition to asking the server or network elements to identify themselves, the enrichment record in the discovery connection then also is used to request the server to reveal the details of its key-negotiation mechanism (i.e. the above URL). Upon receiving the query in the enrichment record, the server returns the URL in an enrichment record sent to the network element on the same connection. Upon receiving the secure URL, the network entity makes a separate request to the URL, providing its own identification (e.g. a client-cert). The server then verifies the identity. If the server wants to accept enrichments from the network entity, then it returns a key to the entity as part of the response. The network element is now able to create encrypted and/or signed enrichments for any connection going to the server. The key can be re-negotiated as many times as required over the course of time following the same procedure. As noted in the previous section, the method can discover enrichment-capable network elements in the path to the destination server even if the server itself is not enrichment-capable. In such a scenario, the above-described can be used for the negotiation of keys for pairs of communicating network elements, not involving the server.

Figure 9:
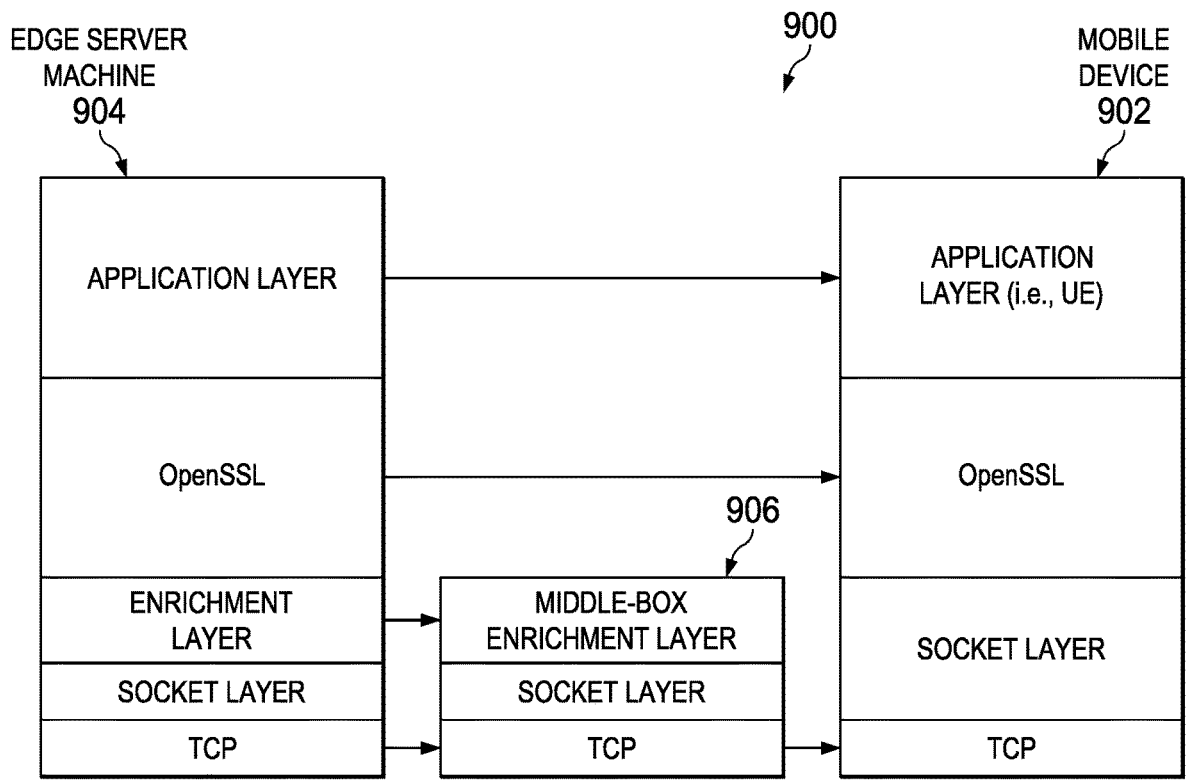
FIG. 9 depicts a preferred software layering approach for implementing an enrichment layer functionality.

FIG. 9 further illustrates a preferred software layering approach of this disclosure and, in particular, how the enrichment layer 906 in the middle-box 900 interoperates with the layers at each end of the SSL communication. In this embodiment, the client 902 is a mobile device (UE) connecting to an edge server HTTP proxy 904.

Figure 10:
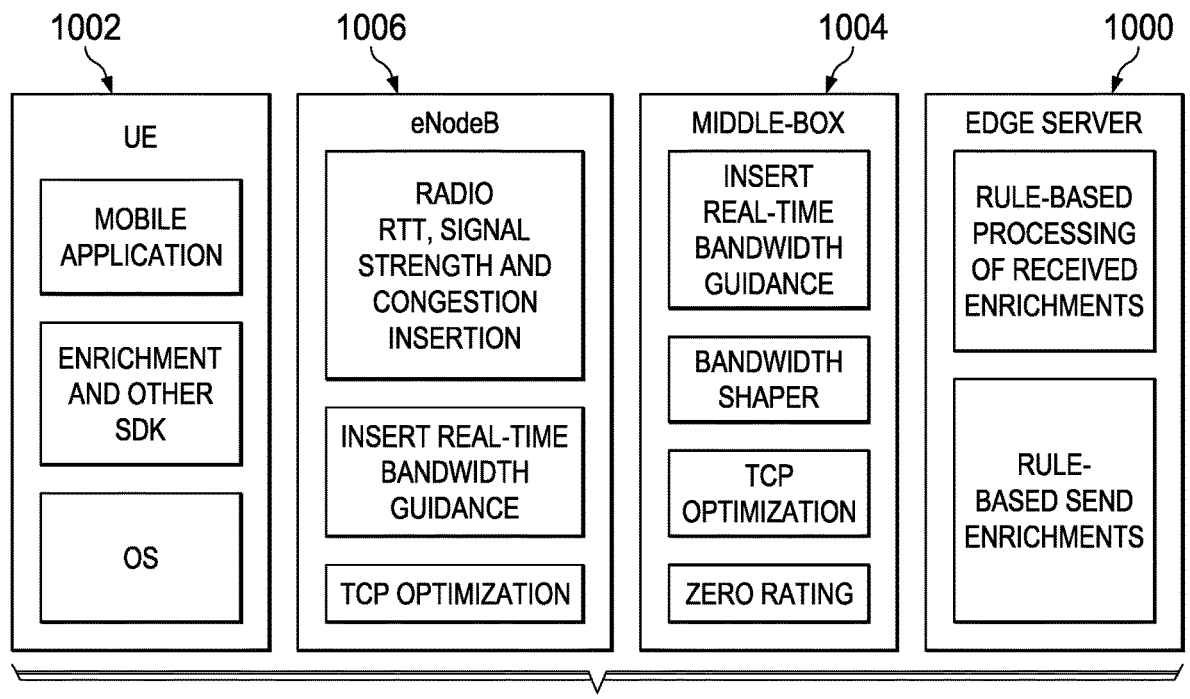
FIG. 10 depicts how SSL enrichment may be used in a mobile networking environment according to this disclosure.

FIG. 10 illustrates various applications of SSL enrichment in mobile networks. In this embodiment, various network services are chained and may interact with one another. In this representative, but non-limiting operating scenario, an over-the-top (OTT) adaptive bitrate stream is desired to be delivered from the edge server 1000 to a requesting mobile device (the user equipment (UE)) 1002. A middle-box 1004 is positioned between a radio access network element (e.g., an eNodeB application) 1006 and the edge server 1000. The SSL enrichments described above are a way to provide a two-way communication channel among the identified services. For example, here the network communicates to the edge server various radio conditions (e.g., recommended BW limit), and the edge server informs the network of the chosen stream bandwidths. The edge server also informs the middle box and eNodeB application what TCP optimization settings they should use in the EPC and on the radio. The edge server informs the UE's OS platform of the stream bandwidth. Of course, these are merely representative HTTPS request enrichments.

The above example depicts how the technique of this disclosure provides for radio-aware SSL enrichment. The radio status information is collected and then sent using SSL enrichment, as part of the SSL connection, to an overlay network. By obtaining this information, the overlay network can adapt and optimize the content for mobile delivery in the CDN, thereby providing better mobile user experience, higher network utilization and lower network congestion.

The technique of this disclosure thus provides for providing the enrichment data by injecting an enrichment record into the SSL connection, and for retrieval of the enrichment data by removing the enrichment record and sending the original record flow to the SSL layer.

The particular functionality of the middle box that implements the described functionality is not intended to be limiting. Typically, and as described, the enrichment (e.g., throughput information) is added as data packets are forwarded through the device.

Figure 11:
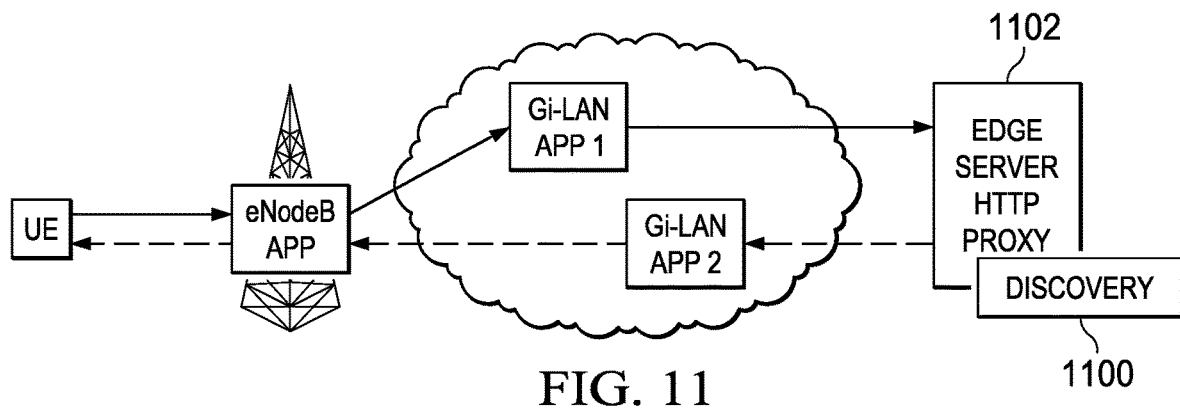
FIG. 11 illustrates how a service discovery protocol may be used to discuss service APIs, and to negotiate encryption keys, in the mobile networking environment.

FIG. 11 illustrates how the service discovery protocol 1100 (e.g., operating in edge server 1102 in this example) and as described above may be used to discover enrichment-capable devices and other service APIs, and to negotiate encryption keys.

As can be seen, the enrichment technique described above relies on SSL record type and version numbers to differentiate between, on the one hand, the original SSL records (written by the endpoints of the connection), and, on the other hand, the enrichment records (inserted by a middle entity). This specific method of differentiation is not intended to be limiting.

References herein to SSL should not be considered limiting, as the approach applies as well to Transport Layer Security (TLS) connections. Thus, for purposes herein, SSL and TLS are interchangeable.

Accordingly, and as depicted in FIG. 5, a new layer (namely, enrichment layer 504 in FIG. 5) between TCP and SSL or TLS is introduced. By virtue of this position in the protocol stack, the enrichment layer is able to recognize data flowing on SSL/TLS connections in either direction as a sequence of structured SSL/TLS records. In one embodiment, a new type of SSL/TLS record (also sometimes referred to herein as an AUX record) is then provided for and exists at the layer for purposes of communicating data, preferably between network services and other servers (such as HTTP servers). As described above, preferably network services and the servers directly insert their data into the SSL/TLS connections in the form of AUX records, and retrieve them.

The enrichment layer in FIG. 5 may be implemented as a user-level library, e.g., linked with an application at compile time. Thus, preferably the approach herein operates as an application-layer mechanism, although this is not a limitation. As described above, preferably the enrichment layer provides an API for the application to send or retrieve auxiliary data through the mechanism.

Preferably, AUX records are not inserted into a connection unless the sender is sure that they will not cause errors at their intended destination or at any intervening network element. In addition, the entity inserting data must know the format in which the destination expects it to arrive.

As a skilled person will appreciate, the mechanism described herein provides for in-band data communication for use with end-to-end encrypted traffic flows, but which does not interfere with encryption in any way. Preferably, the mechanism allows either endpoint of an SSL/TLS connection or an intervening middle box to insert/retrieve/delete auxiliary data into the TCP flow of the connection.

As an option, the data exchanged in the AUX record may itself be protected by enabling the communicating entities to exchange the data in plaintext, signed plaintext, or encrypted with an auxiliary key.

Preferably, and because in a representative embodiment AUX records are essentially invalid SSL/TLS records, they are not allowed to reach the TLS layer at either endpoint of the TLS connection. To support AUX records at either endpoint, preferably the application at such endpoint has the record handling layer (e.g., enrichment layer 504 in FIG. 5) sandwiched between the TCP and SSL/TLS layers, as previously depicted and described. Preferably, the enrichment layer is responsible for handling the AUX records, and keeping them from reaching the TLS layer.

The following provides additional details regarding a representative discovery and negotiation protocol that may be implemented by the mechanism. For descriptive purposes, the steps of the protocol are presented in the context of an environment in which clients make HTTPS requests to a server (S) on the internet, and the data flow passes through a network element in the middle (NE). The protocol describes what NE should do to initiate metadata communication with S. As used below, the enrichment layer support is referred to as "TLS-AUX."

Discovery Protocol

1. If S wants to send and/or receive metadata to/from NE, then it should publicly advertise TLS-AUX support, e.g., through two custom options in its SSL certificate. The option TLS-AUX-Support may have the values of SEND, RECEIVE or SENDRECEIVE, indicating whether the server is interested in only sending metadata, only receiving metadata, or both.

The option TLS-AUX-NegotiationURL may contain the URL where any interested NE can negotiate the format of the metadata and cryptographic keys to be used (if applicable) for the payload of the AUX records.

2. If NE has the ability to observe traffic flow, then it may discover all the server IPs that serve TLS traffic to clients downstream from NE, as well as the domain names hosted by them, from either the certificate or the SNI part of the handshake. Further, NE may identify the subset of the servers that advertise TLS-AUX support in their server certificates. For TLSv1.2 or below, NE should do so by observing the server certificates on the wire. For TLSv1.3 or higher, the certificates sent by a server are encrypted, and thus cannot be examined by NE. In this case, NE should explicitly initiate a TLS handshake with SNI to S for each known domain name served by the S. It should thus retrieve all the domains' certificates from S, and examine them to discover which domains support TLS-AUX. Business rules configured in NE may be used to further short-list the servers that the NE should engage in TLS-AUX communication with.

Negotiation Protocol

Once NE has decided to send and/or receive metadata to/from a server S, then NE should initiate the negotiation protocol. Preferably, the protocol is run out-of-band from live user traffic.

1. All the protocol negotiations must happen over a TLS connection that NE initiates to S. NE must insert a zero-length TLS-AUX record into this connection after the TLS connection is established, before any further communication. If the insertion of this record gives rise to a TLS error, then NE must conclude that either S or an invisible network element on the network path to S does not support TLS-AUX. The protocol fails and NE must not insert any TLS-AUX records into connections destined to S.

2. If step 2 does not fail, then NE should make a POST request to the negotiation URL provided in the server's certificate. In the POST body, NE must include a request for the metadata schema and encryption methods supported by the server.

3. Upon receiving the POST request body from NE, S must decide if it wants to engage in metadata communication with the NE. To decline, it must respond with an HTTP 403 (Forbidden) response. If S decides to accept this request, it should create a new TLS-AUX session for metadata exchange between NE and S. To notify acceptance, it must respond with an HTTP status 200 (OK). In the response body, S must provide a session-id, the types of metadata that it is willing to send and/or receive, the crypto algorithm, a key, and the expiration time of the key. The key is for the encryption of the payload of TLS-AUX records exchanged as part of the session. Both NE and S must associate the key with the session. If S wants the payload of the TLS-AUX record to be in plaintext, then the crypto algorithm should indicate so, and the key would be irrelevant.

4. If NE's POST request indicated that it might want to receive metadata from S, then S must include a zero-length TLS-AUX record into this connection before the response is sent.

5. Upon receiving an HTTP 200 response, NE must identify the subset of the server's metadata types that it wants to send and/or receive. It then must make a second POST request to the same URL, identifying the subset of interest in the send and receive direction in the session.

6. Upon receiving the second POST, S must respond either with an HTTP 200 (OK) to confirm or HTTP 403 (Forbidden) to deny, which concludes the negotiation.

Upon the completion of the steps of the negotiation protocol, S and NE have an established TLS-AUX session, with a common knowledge of the crypto scheme, key and expiration time of the session. The sender of the metadata should use the key to encrypt or sign the metadata sent through TLS-AUX records. The key cannot be used after the expiration date. TLS-AUX session may be re-negotiated by NE any time to get a valid key.

Internet routes are not stable and can change over time. This means that any new incompatible network element may get introduced in the path between NE and S within the lifetime of an existing TLS-AUX session, which can deny traffic till the end of the established session's lifetime. A renegotiation of the session after expiration would remedy the situation. It can be argued that network elements that examine TLS record structures may be present near the endpoints of the connection (e.g., services in the Gi-LAN of mobile networks or security appliances in the datacenter where servers are hosted), rather than in the public Internet paths. Therefore, path changes on the internet are far less likely to bring about this situation than a change of network configuration near the endpoints. Because the networks and servers are willful participants in TLS-AUX sessions, they can be expected to avoid this situation through their operations processes.

Session Identification

As long as a valid TLS-AUX session exists between NE and S, they may insert/remove TLS-AUX records into users' data-flows. However, network middle-boxes are often transparent or are located in private network space, which makes them invisible to S. As a result, when a user's TLS connection arrives at S, it may not be possible for S to tell which TLS-AUX session it may belong to, which is required to locate the decryption key for deciphering the metadata contained in the TLS-AUX record, and knowing which metadata parameters have been negotiated for that session. To help S identify the session, if NE intends to exchange metadata with S for any TLS connection, then it should send a TLS-AUX record to S containing the session-id in the beginning of the TLS connection establishment. S must not send any TLS-AUX records on any connection unless it is able to identify the TLS-AUX session to which the connection belongs.

Although the protocol is described above in the context of one NE and one S, it is extensible to an environment with multiple NEs along the path between clients and S. In such an environment, each NE must negotiate its own TLS-AUX session with the server, and a TLS connection between the client and the server may belong to multiple TLS-AUX sessions. The library description below assumes a single TLS-AUX session for each connection. An extension to support multiple sessions is straightforward.

The following provides additional details regarding implementation of a TLS-AUX library in one embodiment. As noted above, at any entity that terminates a TLS connection, AUX records must be processed and removed before they can reach the TLS layer. The following is a method to implement the library for reference. It is a user-level library to be linked with the application at compile time, with a few specific system-call wrapper options. In this embodiment, FIG. 13 depicts the software layering arrangement. FIG. shows the library API that the AUX layer provides to the application to send/retrieve metadata. To identify a connection's TLS-AUX session and to send/receive metadata on a connection, the application should call the API functions and provide the file-descriptor of the TLS connection. Any responsibility of handling encryption or signing of the metadata in TLS-AUX records preferably lies with the library, and the application is expected to work with unencrypted metadata.

System Call Wrapping

TLS libraries such as OpenSSL are user-space libraries, and they use TCP sockets for network communication. It uses the standard system calls such as open( ), close( ), read( ), readv( ), write( ), writev( ), listen( ), and accept( ) with underlying sockets. The TLS-AUX layer intercepts the calls between the TLS library and sockets by using the mechanism of system call wrapping. The TLS-AUX library hijacks all the above system calls, so that when the TLS library makes one of these system calls, the corresponding function of the TLS-AUX layer gets called. The layer can then invoke the original system call, in addition to performing additional actions, as described below.

Receiving Metadata

When the TLS layer calls read( ) to receive data from the network, the TLS-AUX layer's read wrapper function gets called. This function, in turn, invokes the original system call read( ) to receive data from the network. The read( ) wrapper function then operates on the data received from the network, separates TLS-AUX records from the original TLS records. The metadata received from the TLS-AUX records on any TLS connection is decrypted or stored in a memory table corresponding to that connection. The leftover data is then passed on to the TLS layer as part of the read( ) call. When the application calls the API functions such as get_tlsaux_item_count( ), read_tlsaux_item_size( ), read_tlsaux_item( ), etc., the TLS-AUX layer answers the calls using the table that stores these items for each connection.

Sending Metadata

As mentioned previously, metadata may not be sent on a TLS connection, unless its TLS-AUX session(s) can be identified. When it is known, and the application layer calls write_tlsaux_item( ), it is stored into another table that stores outgoing metadata for each file descriptor. When TLS layer makes a write( ) call on the connection, the TLS-AUX layer's write wrapper function gets called. This function, in turn, is responsible for writing TLS-AUX records into the connection, followed by the original encrypted TLS records received as the argument of the write( ) function.

Handling Encryption of the AUX Frames Payload

Once the TLS-AUX session has been established by the application with an NE, it can set the session's encryption details in the library using the setSessionDetails( ) function. The library can then use the encryption method and key to decrypt metadata in the TLS-AUX messages, or to check signatures for validity.

Applications of the described mechanism are many.

A typical use case is one in which a mobile network wants to send metadata to media servers (CDN and otherwise) located on the public internet, so that media delivery can be optimized.

Another use-case is one in which a mobile network sends metadata to media servers located on the public internet to optimize network resource usage and deliver a better QoE to its subscribers.

Yet another use case is one in which a web server on the public internet wants to send metadata to a proxy located inside the private network space of a mobile network. Of course, these are just representative examples.

Figure 12:
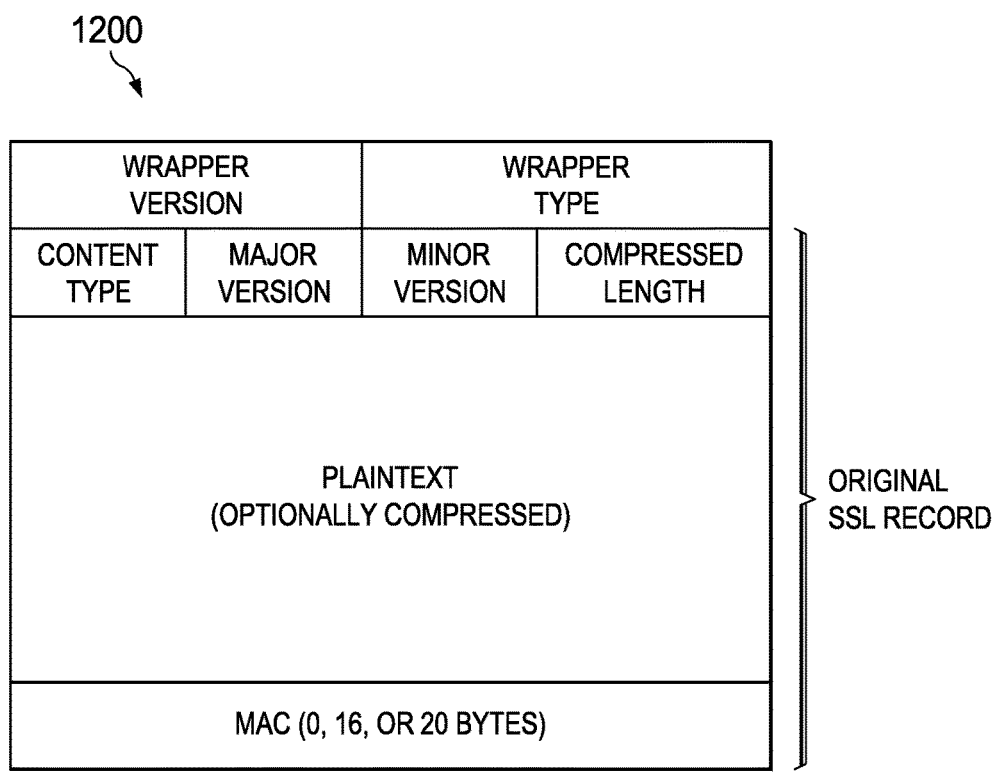
FIG. 12 depicts an alternative approach for insertion of enrichment using an SSL record wrapping protocol.

An alternative approach for insertion of enrichment is now described. In this method, the enrichment library on the middle-box and the connection's two endpoints support an SSL record wrapping protocol. The structure of the record wrapper is shown in FIG. 12 by way of example. In one embodiment, the wrapper 1200 has two header fields (version and type) and is meant to enclose an SSL record as its payload. The values of the header fields preferably identify if the wrapper contains an SSL record, or if it contains something different than an SSL record. For instance, wrapper type 0 could be used to indicate that the wrapper's payload is an original SSL record, while wrapper type 1 could indicate that the payload is enrichment information. These are merely representative type values.

The following describes how the participants (the middle-box or either endpoint of the connection) read and write enrichments in this alternative technique. The writing enrichments scenario is described first. In particular, at every participant in the relevant flow, preferably the enrichment library observes the flow of records on each SSL connection. The records may be original SSL records, or they may be wrapped by another entity. If the records are not wrapped, preferably the library wraps them as they pass through. Any enrichment data to be inserted into the connection is then inserted after the end of any wrapped SSL record. In this example, the enrichment data may be inserted as a payload of a wrapper with type 1. Reading enrichments can then proceed as follows. At every participant, the enrichment library observes the flow of records. The records may arrive as regular SSL records, or they may arrive as wrapped records. Based on wrapper type fields, the library identifies enrichment, and takes the relevant records out of the data flow. If the library happens to be located on either endpoint, then it also preferably un-wraps the wrapped SSL records before passing them on to the SSL library.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

What is claimed is as follows:

1. A method operative in a computing entity positioned intermediate between first and second computing entities, the computing entity comprising a software stack comprising an SSL layer and an underlying socket layer, each of the first and second computing entities operative to establish, between them, a Secure Sockets Layer (SSL) or Transport Layer Security (TLS) communication path, wherein during an SSL/TLS data flow between the first and second computing entities one or more SSL/TLS records are generated, comprising:
   configuring an enrichment handling layer between the SSL layer and the underlying socket layer, wherein the enrichment handling layer as configured does not have access to a key that secures the SSL/TLS data flow;
   verifying, by the enrichment handling layer, that at least one of the first and second computing entities are capable of processing illegal SSL/TLS records, wherein an illegal SSL/TLS record is a SSL/TLS record that has an invalid record type value associated therewith; and
   upon the enrichment handling layer verifying that at least one of the first and second computing entities is capable of processing illegal SSL/TLS records, and without modifying the SSL layer or having access to content secured by the SSL/TLS data flow, injecting into or removing from the SSL/TLS data flow enrichment information, the enrichment information associated with an illegal SSL/TLS record.

2. The method as described in claim 1, wherein the enrichment information is enrichment data describing a network status or characteristic, or a device status or characteristic.

3. The method as described in claim 1, wherein the illegal SSL/TLS record has an invalid record type value to designate the SSL/TLS record as being associated with the enrichment information.

4. The method as described in claim 1, wherein the SSL/TLS record has associated therewith a wrapper layer, the wrapper layer including given data to designate the SSL/TLS record as being associated with the enrichment information.

5. The method as described in claim 1, wherein the SSL/TLS record includes the enrichment information.

6. The method as described in claim 1, wherein the SSL/TLS record is the enrichment information.

7. The method as described in claim 1, further including terminating a TCP connection at the enrichment handling layer.

8. The method as described in claim 1, wherein the first computing entity is a mobile device and the second computing entity is an edge server of an overlay network.

9. The method as described in claim 1, wherein injecting the enrichment information comprises ordered steps of:
   intercepting a system call between the SSL layer and the underlying socket layer and, in response, calling a corresponding wrapper function; and
   invoking, by the corresponding wrapper function, the system call.

10. The method as described in claim 9, wherein the system call is a write system call.

11. The method as described in claim 10, wherein the invoking step sends data to a given one of the first and second computing entities, writes and outputs at least one SSL/TLS data record, and then outputs to the underlying socket layer the enrichment data.

12. The method as described in claim 9, wherein the system call is a read system call.

13. The method as described in claim 12, wherein the invoking step removes from a received SSL/TLS record the enrichment information, and then outputs to the underlying socket layer any remaining data.

14. The method as described in claim 1, further including the enrichment handling layer initiating a discovery protocol to determine whether a given entity along the SSL/TLS data flow is capable of processing the enrichment information associated with the SSL/TLS record.

15. An apparatus positioned intermediate between first and second computing entities, each of the first and second computing entities operative to establish, between them, a Secure Sockets Layer (SSL) or Transport Layer Security (TLS) communication path, wherein during an SSL/TLS data flow between the first and second computing entities one or more SSL/TLS records are generated, the apparatus comprising:
   a processor;
   computer memory supporting a software stack, the software stack comprising at least an SSL layer, an underlying socket layer, and an enrichment handling layer positioned between the SSL layer and the underlying socket layer, wherein the enrichment handling layer does not have access to a key that secures the SSL/TLS data flow;
   wherein the enrichment handling layer is configured to verify that at least one of the first and second computing entities is capable of processing illegal SSL/TLS records, wherein an illegal SSL/TLS record is a SSL/TLS record that has an invalid record type value associated therewith;

wherein upon the enrichment handling layer verifying that at least one of the first and second computing entities is capable of processing illegal SSL/TLS records, the enrichment handling layer is further configured to terminate TCP connections and, without modifying the SSL layer or having access to content secured by the SSL/TLS data flow, to inject into or remove from the SSL/TLS data flow enrichment information, the enrichment information associated with an illegal SSL/TLS record.

16. The apparatus as described in claim 15, wherein the enrichment information is enrichment data describing a network status or characteristic, or a device status or characteristic.

17. The apparatus as described in claim 15, wherein the illegal SSL/TLS record has an invalid record type value to designate the SSL/TLS record as being associated with the enrichment information.

18. The apparatus as described in claim 15, wherein the SSL/TLS record has associated therewith a wrapper, the wrapper including given data to designate the SSL/TLS record as being associated with the enrichment information.

19. The apparatus as described in claim 15, wherein the enrichment handling layer injects or removes the enrichment information by:

intercepting a system call between the SSL layer and the underlying socket layer and, in response, calling a corresponding wrapper function; and invoking, by the corresponding wrapper function, the system call.

20. The apparatus as described in claim 19, wherein the system call is one of: a write system call, and a read system call, the write system call writing the enrichment information into the SSL/TLS data flow, the read system call reading the enrichment information from the SSL/TLS data flow.

* * * * *